United States Patent
Dong et al.

(10) Patent No.: US 12,039,981 B2
(45) Date of Patent: Jul. 16, 2024

(54) METHOD, APPARATUS, DEVICE, AND STORAGE MEDIUM FOR SPEAKER CHANGE POINT DETECTION

(71) Applicant: Beijing Youzhuju Network Technology Co., Ltd., Beijing (CN)

(72) Inventors: Linhao Dong, Beijing (CN); Zhiyun Fan, Beijing (CN); Zejun Ma, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/394,143

(22) Filed: Dec. 22, 2023

(65) Prior Publication Data
US 2024/0135933 A1 Apr. 25, 2024

Related U.S. Application Data

(63) Continuation of application No. PCT/CN2022/100443, filed on Jun. 22, 2022.

(30) Foreign Application Priority Data

Jun. 30, 2021 (CN) .......................... 202110745056.X

(51) Int. Cl.
*G10L 21/0272* (2013.01)
*G10L 17/04* (2013.01)

(52) U.S. Cl.
CPC .................................. *G10L 17/04* (2013.01)

(58) Field of Classification Search
CPC ......... G10L 17/00; G10L 15/22; G10L 25/78; G10L 15/04; G10L 17/04; G10L 21/0272;
(Continued)

(56) References Cited

U.S. PATENT DOCUMENTS 9,311,594 B1\* 4/2016 Fisher .................... G06N 3/049
10,347,241 B1 7/2019 Meng et al.
(Continued)

FOREIGN PATENT DOCUMENTS

| CN | 110136749 A | 8/2019 |
| CN | 110517667 A | 11/2019 |

(Continued)

OTHER PUBLICATIONS

Dong et al., CIF: Continuous Integrate-and-Fire for End-to-End Speech Recognition, Feb. 12, 2020, Institute of Automation, Chinese Academy of Sciences, p. 1-4.\*

(Continued)

*Primary Examiner* — Jakieda R Jackson
(74) *Attorney, Agent, or Firm* — Alleman Hall & Tuttle LLP

(57) ABSTRACT

A method, apparatus, device, and storage medium for speaker change point detection, the method including: acquiring target voice data to be detected; and extracting an acoustic feature characterizing acoustic information of the target voice data from the target voice data; encoding the acoustic feature to obtain speaker characterization vectors at a voice frame level of the target voice data; integrating and firing the speaker characterization vectors at the voice frame level of the target voice data based on a continuous integrate-and-fire CIF mechanism, to obtain a sequence of speaker characterizations bounded by speaker change points in the target voice data; and determining a timestamp corresponding to the speaker change points, according to the sequence of the speaker characterizations bounded by the speaker change points in the target voice data.

20 Claims, 4 Drawing Sheets

(58) Field of Classification Search
CPC ......... G10L 15/08; G10L 25/87; G10L 15/05; G10L 15/02; G10L 25/30; G10L 15/063; G06F 3/165; G06F 18/213; G06N 30/44; G06N 3/045; G06N 3/049

See application file for complete search history.

(56) References Cited

U.S. PATENT DOCUMENTS

| | | | |
|---|---|---|---|
| 2010/0166315 A1* | 7/2010 | Paquier | G06F 18/24 382/190 |
| 2010/0303101 A1* | 12/2010 | Lazar | H03M 3/502 370/521 |
| 2011/0035215 A1* | 2/2011 | Sompolinsky | G10L 15/04 704/E15.001 |
| 2014/0074761 A1* | 3/2014 | Hunzinger | G06N 3/049 706/15 |
| 2016/0260429 A1* | 9/2016 | Jin | G10L 25/87 |
| 2017/0337469 A1* | 11/2017 | Debes | G06N 3/049 |
| 2018/0336880 A1* | 11/2018 | Arik | G10L 25/30 |
| 2019/0318725 A1 | 10/2019 | Le Roux et al. | |
| 2019/0370598 A1* | 12/2019 | Martin | G06V 10/768 |
| 2020/0126556 A1* | 4/2020 | Mosayyebpour | G10L 15/063 |
| 2021/0132688 A1* | 5/2021 | Kim | H04N 19/164 |
| 2021/0192287 A1* | 6/2021 | Dwivedi | G06F 9/3877 |
| 2021/0192314 A1* | 6/2021 | Aarts | G06N 3/044 |
| 2021/0193169 A1* | 6/2021 | Faizakof | G10L 15/04 |

FOREIGN PATENT DOCUMENTS

| | | |
|---|---|---|
| CN | 110517694 A | 11/2019 |
| CN | 110910891 A | 3/2020 |
| CN | 111816218 A | 10/2020 |
| CN | 112489629 A | 3/2021 |
| CN | 112750446 A | 5/2021 |
| CN | 112802498 A | 5/2021 |
| CN | 113470698 A | 10/2021 |
| JP | 08166796 A | 6/1996 |

OTHER PUBLICATIONS

ISA China National Intellectual Property Administration, International Search Report Issued in Application No. PCT/CN2022/100443, Jul. 22, 2022, 12 pages.

* cited by examiner

METHOD, APPARATUS, DEVICE, AND STORAGE MEDIUM FOR SPEAKER CHANGE POINT DETECTION

CROSS REFERENCE TO RELATED APPLICATIONS

This application is a continuation of International Patent Application No. PCT/CN2022/100443, filed on Jun. 22, 2022 and entitled "METHOD, APPARATUS, DEVICE, AND STORAGE MEDIUM FOR SPEAKER CHANGE POINT DETECTION", which claims priority to Chinese patent application No. 202110745056.X, filed with the Patent Office of China on Jun. 30, 2021, and entitled "METHOD, APPARATUS, DEVICE, AND STORAGE MEDIUM FOR SPEAKER CHANGE POINT DETECTION". All the aforementioned patent applications are hereby incorporated by reference in their entirety.

TECHNICAL FIELD

The present disclosure relates to the field of voice processing technology, and in particular a method, apparatus, device, and storage medium for speaker change point detection.

BACKGROUND

With the rapid development of mobile Internet, Internet of Things, and Artificial Intelligence (AI) technology, voice interactions, as a next-generation human-computer interaction method, can bring great convenience to people's lives, but it also requires accurate detection of speaker change points in an interaction voice segment. For example, in the process of teaching evaluations and reviews of students after a class, what the teacher speaks in the class is often the key content. However, it is inevitable that voice interactions such as student speaking, teacher communicating with students, and free discussions and the like occur in the class. If the accurate detection of the change points of different speakers in the interaction voice segments produced by these interactions is not performed so as to determine the time zones of the different speakers to find out the key contents spoken by the teacher during the class, but the interaction voice segments produced by these interactions are input into a teaching evaluation system or revision materials of students without filtering, it will waste a lot of resources such as manpower, material and time to find out the key contents of the class.

SUMMARY

The main purpose of embodiments of the present application is to provide a method, apparatus, device, and storage medium for speaker change point detection, which can effectively improve the accuracy of the result of the speaker change point detection in the interaction voice.

In the first aspect, the embodiments of the present application provide a method for speaker change point detection, comprising:
acquiring target voice data to be detected; and extracting an acoustic feature characterizing acoustic information of the target voice data from the target voice data;
encoding the acoustic feature to obtain speaker characterization vectors at a voice frame level of the target voice data;
integrating and firing the speaker characterization vectors at the voice frame level of the target voice data based on a continuous integrate-and-fire (CIF) mechanism, to obtain a sequence of speaker characterizations bounded by speaker change points in the target voice data; and
determining a timestamp corresponding to the speaker change points, according to the sequence of the speaker characterizations bounded by the speaker change points in the target voice data.

In the second aspect, the embodiments of the present application provide an apparatus for speaker change point detection, the apparatus comprising:
a first acquiring unit, configured to acquire target voice data to be detected; and extract an acoustic feature characterizing acoustic information of the target voice data from the target voice data;
an encoding unit, configured to encode the acoustic feature, to obtain speaker characterization vectors at a voice frame level of the target voice data;
a firing unit, configured to integrate and fire the speaker characterization vectors at a voice frame level of the target voice data based on a continuous integrate-and-fire (CIF) mechanism, to obtain a sequence of speaker characterizations bounded by speaker change points in the target voice data;
a determination unit, configured to determine a timestamp corresponding to the speaker change points, according to the sequence of the speaker characterizations bounded by the speaker change points in the target voice data.

In the third aspect, the embodiments of the present application provide a device, the device comprising: a processor and a memory;
the memory, is configured to store instructions or computer programs;
the processor, is configured to execute the instructions or the computer programs in the memory, to cause the electronic device to perform any of the implementations of the method for speaker change point detection described above.

In the fourth aspect, a computer-readable storage medium provided by the embodiments of the present application, the computer-readable storage medium having instructions stored thereon, the instructions when executed by a terminal device, causing the terminal device to perform any of the implementations of the method for speaker change point detection described above.

In a fifth aspect, the embodiments of the present application provide a computer program product, the computer program product comprising instructions carried on a non-transitory computer-readable medium, the computer program containing program codes for performing any of the implementations of the method for speaker change point detection described above.

BRIEF DESCRIPTION OF THE DRAWINGS

For the purpose of more clarity in illustrating embodiments of the present application or technical solutions in the current technologies, reference drawings to be used in the descriptions of the embodiments or the current technologies will be briefly presented below. Obviously, the reference drawings in the descriptions below are only some of the embodiments of the present application and other reference drawings may be obtained according to these drawings for those of ordinary skill in the art without creative working.

DETAILED DESCRIPTION

Figure 1:
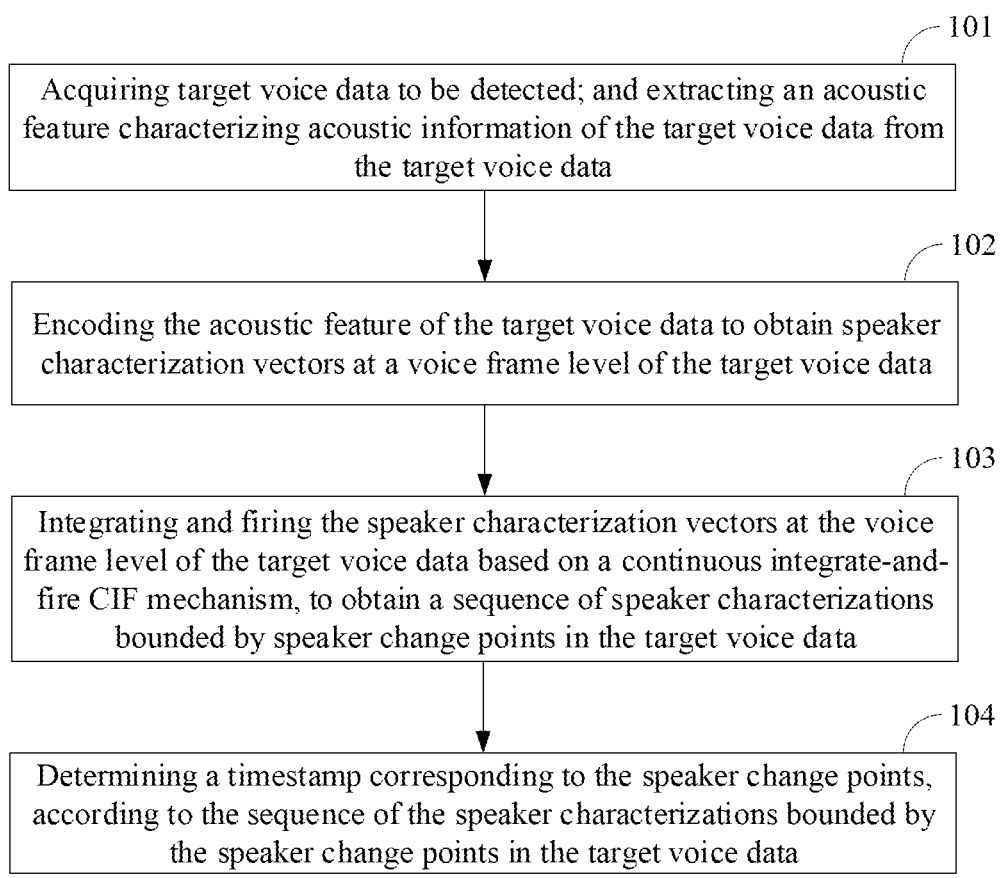
FIG. 1 is a flow schematic diagram of a method for speaker change point detection provided by embodiments of the present application.

With the rapid development of network technology and the increasing popularity of various intelligent terminal devices and application software, voice interactions, as the way of next-generation human-computer interactions, can bring great convenience to people's lives, but it also requires the accurate detection of speaker change points in the interaction voice segment. The current methods for the speaker change point detection usually include the following two methods.

The first method is a detection method based on a speaker classifier. Specifically: firstly, one speaker feature extractor is trained by utilizing the speaker classification; then, a long voice segment with multiple speakers is cut into multiple voice segments with a fixed window length; then, speaker characterization vectors of each voice segment is extracted by utilizing the speaker feature extractor that has been pre-trained, thereby whether a speaker change has occurred or not can be determined, by comparing differences between the speaker characterizations of neighboring voice segments, e.g., in a case where the difference between speaker characterizations of two neighboring voice segments exceeds a certain threshold, it can be considered that a speaker change has occurred between the two voice segments. As can be seen, since the detection method is a pipelined scheme with multiple steps in series, the implementation of the whole detection scheme is relatively complex and the overall optimization of each part cannot be achieved. Meanwhile, since the detection method requires cutting the voice into multiple fixed-length voice segments beforehand, which causes the precision of the speaker change point detection to be limited by the cut length of the voice segments. In addition, the method is unable to detect time points at which speakers change rapidly within the same audio segment, resulting in inaccurate detection results.

The second detection method is to transform a speaker change point detection task into a binary classification task at the voice frame level, wherein, for the detection result of each voice frame (including 0 and 1), "0" represents a non-change point, and "1" represents a change point. In this way, the training and reasoning process of the speaker change point detection task can be finished in an end-to-end manner. Although the detection method can implement the change point detection at the voice frame level, the disadvantage of the detection method is that it does not simulate the way that the human brain processes the information during the detection process, so that it is impossible to carry out the processing of the cumulative process of the voice information, thereby resulting in insufficiently accurate detection results.

To solve the drawbacks above, the present application provides a method for speaker change point detection, which firstly acquires target voice data to be detected; and extracts an acoustic feature(s) characterizing acoustic information of the target voice data from the target voice data; then encodes the acoustic feature, to obtain speaker characterization vectors at a voice frame level of the target voice data; afterward, integrates and fires the speaker characterization vectors at the voice frame level of the target voice data based on a CIF, to obtain a sequence of speaker characterizations bounded by speaker change points in the target voice data; and then can determine a timestamp corresponding to the speaker change points, according to the sequence of the speaker characterizations. As can be seen, since the embodiments of the present application simulate the way that a human brain processes information, fully integrating and firing speaker characterization vectors that is accumulated frame by frame in the target voice data by CIF, so as to be able to effectively improve the accuracy of the result of the speaker change point detection in the target voice data with a type of interaction.

To make the purpose, technical solutions, and advantages of the embodiments of the present application clearer, the technical solutions in the embodiments of the present application will be described clearly and completely in the following in conjunction with the accompanying drawings in the embodiments of the present application, and it is apparent that the described embodiments are a part of the embodiments of the present application rather than all the embodiments. Based on the embodiments in this application, all other embodiments obtained by those of ordinary skill in the art without making creative are within the scope of protection of the application.

A First Embodiment

As seen in FIG. 1, a flow schematic diagram of a method for speaker change point detection provided by the embodiment is illustrated, the method comprising Step 101-Step 104 as below.

Step 101: acquiring target voice data to be detected; and extracting an acoustic feature characterizing acoustic information of the target voice data from the target voice data.

In this embodiment, the target voice data is defined as any of the interaction voice data with multiple speakers utilizing this embodiment for speaker change point detection. In addition, this embodiment does not limit the type of language for the target voice data. For example, the target voice data may be voice data in Chinese, or voice data in English, and the like. Meanwhile, this embodiment does not limit the length of the target voice data either. For example, the target voice data may be one segment, or multiple segments, and the like.

It is understood that the target voice data may be acquired by recording or the like ways according to practical needs. For example, telephone conversation voices or recordings of meetings, and the like in people's daily lives may be used as the target voice data. After acquiring the target voice data, the solution provided by this embodiment may be utilized to implement the detection of speaker change points in the target voice data.

Further, after acquiring the target voice data to be detected, in order to accurately detect a timestamp corresponding to the speaker change points during the target voice, it requires utilizing the method of feature extraction to extract an acoustic feature characterizing the acoustic information of the target voice data and uses the acoustic feature as a detection basis, for implementing the effective detection of the speaker change points in the target voice through the subsequent Steps 102-Steps 104.

Specifically, when extracting the acoustic feature of the target voice data, firstly it requires a framing process for the target voice data to obtain a corresponding sequence of voice frames, then the framed sequence of voice frames is pre-emphasized; and then the acoustic feature of each one of the voice frames is extracted sequentially, wherein the acoustic feature refer to feature data for characterizing the acoustic information of the corresponding voice frame, which, for example, may be a Mel-scale Frequency Cepstral Coefficients (MFCC) feature or a Perceptual Linear Predictive (PLP) feature, or the like.

It is noted that the embodiments of the present application do not limit the extraction method of the acoustic feature of the target voice, nor limit the specific process of the extraction. An appropriate extraction method may be selected according to the actual situation, as well as the corresponding operation of the feature extraction.

Step 102: encoding the acoustic feature, to obtain speaker characterization vectors at a voice frame level of the target voice data.

In this embodiment, after acquiring the target voice data to be detected and extracting its corresponding acoustic feature by Step 101, in order to accurately determine the speaker change points in the target voice data, further, it is also required to encode the acoustic feature of the target voice data to obtain the speaker characterization vectors at the voice frame level of the target voice data, which is used to implement the accurate detection of the speaker change points in the target voice data by the subsequent Step 103-Step 104.

Herein, one possible implementation is that the implementation process of the Step 102 may specifically comprise: inputting the acoustic feature of the target voice data into a bi-directional long short-term memory (BiLSTM) network for encoding, to obtain speaker characterization vectors at the voice frame level characterizing the contextual voice information of the target voice data, which is defined herein as H. Each of the speaker characterization vectors at the voice frame level therein is defined as h.

In this implementation, encoding the acoustic feature (e.g., MFCC) of the target voice data by utilizing the Bi-LSTM, can utilize network characteristics of the Bi-LSTM, fully taking into account the influence of each of the voice frames in the context of the frame of the voice data on the acoustic feature of each frame of the target voice data when encoding the acoustic feature of each one frame of the target voice data, and using the characterization vector output by the final hidden layer of Bi-LSTM as the speaker characterization vectors corresponding to the target voice data, to characterize the contextual voice information contained in the target voice data. Thereby, the speaker characterization vectors H at the voice frame level characterizing the contextual voice information of the target voice data is obtained, which is used for performing the subsequent Step 103.

Step 103: integrating and firing the speaker characterization vectors at the voice frame level of the target voice data based on a continuous integrate-and-fire (CIF) mechanism, to obtain a sequence of speaker characterizations bounded by speaker change points in the target voice data.

In this embodiment, after encoding the acoustic feature of the target voice data to obtain the speaker characterization vectors H at a voice frame level of the target voice data, in order to accurately determine the speaker change points in the target voice data, the speaker characterization vectors that is accumulated frame by frame in the target voice data can be fully integrated and fired by utilizing the continuous integrate-and-fire (CIF) mechanism by simulating the way that a human brain processes information, to determine and obtain the sequence of speaker characterizations (which is defined as E herein) bounded by the speaker change points in the target voice data, i.e., when the speaker change is determined, firing the sequence of speaker characterizations consisting of the accumulated speaker characterization vector, with the speaker change point corresponding to that moment as the boundary.

In one possible implementation of the embodiments of the present application, the specific implementation process of Step 103 may comprise the following Step 1031-Step 1033.

Step 1031: Based on the CIF, calculating an amount of a difference between the speaker characterization vectors at the voice frame level of the target voice data at the current moment and the integrated sequence of the speaker characterizations obtained at the previous moment, and summing up the amount of the difference obtained at the current moment and the amount of the difference obtained at the previous moment, to obtain a sum of the amount of the difference at the current moment.

Figure 2:
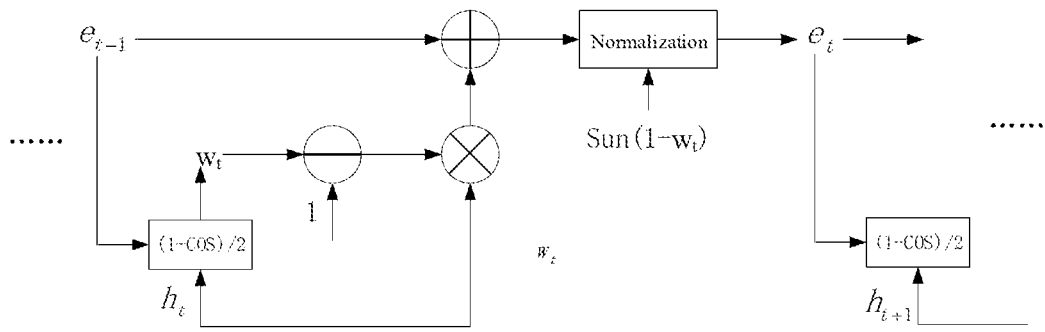
FIG. 2 is a schematic diagram of the structure for integrating and firing speaker characterization vectors at a voice frame level of target voice data based on a CIF, provided by embodiments of the present application.

In this implementation, as shown in FIG. 2, the current moment is defined as the t-th moment, the speaker characterization vectors at the voice frame level of the target voice data at the current moment is defined as $h_t$, and the integrated sequence of the speaker characterizations obtained at the previous moment is defined as $e_{t-1}$. Then, based on the CIF, the amount of the difference $w_t$ between the speaker characterization vectors $h_t$ at the voice frame level of the target voice data at the current moment and the integrated sequence $e_{t-1}$ of the speaker characterizations obtained at the previous moment (i.e., the (t−1)th moment) can be calculated. The specific calculation equation is as below:

$$w_t = [1 - \cos(h_t, e_{t-1})]/2 \tag{1}$$

where, the calculation result of the sequence $e_{t-1}$ of the integrated speaker characterizations obtained at the previous moment (i.e., the (t−1)th moment) can be obtained by utilizing the subsequent calculation equation (3), according to the integrated speaker characterizations $e_{t-2}$ obtained at the (t−2)th moment. It can be understood that if the current moment is the initial moment (i.e., the moment t-th is the initial moment), $e_{t-1}$ is a 0 vector.

Similarly, utilizing the same calculation, the amount of the difference at the (t−1)th moment and any previous moments can be obtained, and on this basis, the amount of the difference obtained moment-by-moment can be summed up to obtain the sum of the amount of the difference, which is defined as $w^a$. It can be understood that the initial value of the amount of the difference is 0, i.e., at the initial moment, $w^a_0=0$, and after summing up moment-by-moment, the sum of the amount of the difference $w_{t-1}^a$ at the (t−1)th moment and the sum of the amount of the difference $w_t^a$ at the t-th moment (i.e., at the current moment) can be obtained. The specific calculation equation is as below:

$$w_t^a = \alpha * w_{t-1}^a + w_t \quad (2)$$

where, $w_t^a$ represents the sum of the amount of the difference at the t-th moment; $w_{t-1}^a$ represents the sum of the amount of the difference at the (t−1)th moment; $w_t$ represents the amount of the difference between the speaker characterization vectors $h_t$ at the voice frame level of the target voice data at the t-th moment and the integrated sequence of the speaker characterizations $e_{t-2}$ obtained at the (t−2)th moment, whose specific value can be obtained according to the above equation (1); $\alpha$ represents a scalar that is greater than 0 and less than 1, which is as an adjustment coefficient for divulging the invalid amount of the difference during the process of integration, thereby preventing the accumulation of invalid amount of the difference during the process of integration. This is because when integrating the target voice data, even if there is no speaker change, it is also possible to accumulate a small amount of different information at each moment, the sequence of the speaker characterizations corresponding to the target voice data at this moment will definitely be fired as the sequence of speaker characterizations bounded by speaker change points as long as the time is long enough to cause the amount of the difference to reach a preset threshold. However, this firing is invalid, which causes to obtain a wrong speaker change. Thus, it requires divulging the invalid amount of the difference during the process of integration through the adjustment of the coefficient $\alpha$, thereby avoiding producing wrong detection results.

Step 1032: based on the CIF, according to the principle of less integration if a large difference and more integration if a small difference, obtaining a sequence of speaker characterizations corresponding to the target voice data at the current moment by a calculation of utilizing the speaker characterization vectors at the voice frame level of the target voice data at the current moment and the integrated sequence of the speaker characterizations obtained at the previous moment.

In this implementation, as shown in FIG. 2, in order to determine more accurate speaker change points, it requires utilizing the CIF to fire a more accurate sequence of the speaker characterizations. Thus, in order to improve the accuracy of the accumulated sequence of speaker characterizations, according to the principle of less integration if a large difference and more integration if a small difference, the sequence of the speaker characterizations corresponding to the target voice data at the current moment (i.e. the t-th moment) can be obtained based on the CIF by the calculation of utilizing the speaker characterization vectors $h_t$ at the voice frame level of the target voice data at the current moment (i.e. the t-th moment) and the integrated sequence of the speaker characterizations $e_{t-1}$ obtained at the previous moment (i.e. the (t−1)th moment). The specific equation is as below:

$$e_t = \frac{\left(\sum_{\tau=0}^{t-1} 1 - w_\tau\right) * e_{t-1} + (1 - w_t) * h_t}{\sum_{\tau=0}^{t} 1 - w_\tau} \quad (3)$$

where, $e_t$ represents the sequence of the speaker characterizations corresponding to the target voice data at the t-th moment; $w_t$ represents the amount of the difference between the speaker characterization vectors $h_t$ at the voice frame level of the target voice data at the t-th moment and the integrated sequence of the speaker characterizations $e_{t-1}$ obtained at the (t−1)th moment, whose specific value can be obtained according to the above equation (1); $e_{t-1}$ represents the integrated sequence of the speaker characterizations obtained at the (t−1)th moment, whose specific result can be obtained according to the integrated sequence of the speaker characterizations $e_{t-2}$ obtained at the (t−2)th moment. It can be understood that if the current moment is the initial moment (i.e., the t-th moment is the initial moment), $e_{t-1}$ is 0 vector and $w_t$ is 0, and thus $e_t$ is $h_t$.

In such way, the sequence of the speaker characterizations corresponding to the target voice data can be updated moment by moment through the equation (3), where, $1-w_t$ is the adjustment coefficient, fully embodying the integration principle of less integration if a large difference and more integration if a small difference. Specifically, if there is a larger amount of the difference $w_t$ obtained at the t-th moment, it indicates that $h_t$ and $e_t$ are very unlikely to belong to the same speaker, and this moment is likely to be a detected speaker change point. Thus, the integration of $h_t$ into $e_t$ should be reduced as much as possible, in order to ensure the accuracy of the accumulated sequence $e_t$ of the speaker characterizations. On the contrary, if there is a smaller amount of the difference $w_t$ obtained at the t-th moment, it indicates that $h_t$ and $e_t$ are very likely to belong to the same speaker, and this moment is not a detected speaker change point. Thus, the integration of $h_t$ into $e_t$ should be as much as possible, in order to ensure the accuracy of the accumulated sequence $e_t$ of speaker characterizations.

It should be noted that, as shown in FIG. 2, the portion in the denominator of Eq. (3) above and the coefficients of $e_{t-1}$ serve as impulse coefficients for normalization to prevent excessive fluctuations in the sequence of the speaker characterizations.

Step 1033: determining whether the sum of the amount of the difference at the current moment exceeds a predetermined threshold, and if so, firing the sequence of the speaker characterizations corresponding to the target voice data at the current moment as the sequence of the speaker characterizations bounded by speaker change points.

In this implementation, after determining the sum $w_t^a$ of the amount of the difference at the current moment (i.e., the t-th moment) through the Step 1031, it is further determined whether $w_t^a$ exceeds the predetermined threshold (the specific value of the predetermined threshold can be set according to the actual situation and the experience value, and the embodiments of the present application do not limit it, for example, the preset threshold can be set to 1, etc.). If so, the sequence $e_t$ of the speaker characterizations corresponding to the target voice data at the current moment determined by the Step 1032 is fired as the sequence of the speaker characterizations bounded by speaker change points, and after the firing, the sequence $e_t$ of the speaker characterizations corresponding to the target voice data at the current moment is set to zero, and the next integrating and firing is re-preformed to determine the next sequence $e$ of the speaker characterizations bounded by the speaker change points.

Alternatively, one possible implementation is that if it is determined that the $w_t^a$ does not exceed the predetermined threshold, the calculation of the amount of the difference $w_{t+1}$ between the speaker characterization vectors $h_{t+1}$ at the voice frame level of the target voice data at the next moment and the integrated sequence $e_t$ of the speaker characterizations at the current moment obtained based on the CIF and subsequent steps are re-performed, until a sum $w^a$ of the amount of the difference that exceeds a predetermined threshold, and the sequence of the speaker characterizations bounded by speaker change is fired at the corresponding moment are obtained.

Step 104: determining a timestamp corresponding to the speaker change points, according to the sequence of the speaker characterizations bounded by speaker change points in the target voice data.

In this embodiment, after obtaining the sequence of the speaker characterizations bounded by the speaker change points in the target voice data through the Step 103, the sequence of the speaker characterizations bounded by speaker change points in the target voice data can be further decoded, to predict the timestamp and the corresponding speaker corresponding to each of the speaker change points according to the results of the decoding.

For example: assuming that the sequence of the speaker characterizations E bounded by the speaker change points in the target voice data (duration of 60 seconds) obtained through step 103, includes four representation vectors, which are $e_1$, $e_2$, $e_3$ and $e_4$ respectively. After inputting the characterization sequence E consisting of these four characterization vectors into the decoder (or classifier), a timestamp to fire $e_1$ (e.g., the 10th second of the target voice data) predicted according to the result of the decoding is a first speaker change point, and the speaker corresponding to $e_1$ is a first speaker (defined here as S1); a timestamp to fire $e_2$ (e.g., the 17th second of the target voice data) predicted according to the result of the decoding is a second speaker change point, and the speaker corresponding to $e_2$ is a second speaker (defined here as S2); a timestamp to fire $e_3$ (e.g., the 44th second of the target voice data) predicted according to the result of the decoding is a third speaker change point, and the speaker corresponding to $e_3$ is a third speaker (defined here as S3); and a timestamp to fire $e_4$ (e.g., the last second of end of the target voice data) predicted according to the result of the decoding is the end moment of the target voice data, and the speaker corresponding to $e_4$ is the first speaker (i.e., S1).

As can be seen, the above example contains a timestamp corresponding to three speaker change points, which are the 10th second of the target voice data, the 17th second of the target voice data, and the 44th second of the target voice data respectively, and the corresponding three speakers are S1, S2, and S3, respectively. The order of voice interactions of these three speakers in the 60-second target voice data are S1, S2, S3, and S1, respectively, i.e., changing from S1 to S2 at the 10th second, changing from S2 to S3 at the 17th second, and changing from S3 to S1 at the 44th second, until the end.

It is noted that in one possible implementation of the present embodiment, after acquiring the target voice data to be detected and extracting its corresponding acoustic feature through the above Step 101, the acoustic feature of the target voice data can be further detected by utilizing a pre-constructed speaker change point detection model, to obtain the timestamp corresponding to the speaker change points in the target voice data. The specific implementing process can be seen in the second embodiment.

It is noted that the specific construction process of the speaker change point detection model can also be referenced to the related description of the second embodiment.

In summary, the method for speaker change point detection provided by this embodiment, which firstly acquires target voice data to be detected; and extracts an acoustic feature characterizing acoustic information of the target voice data from the target voice data; then encodes the acoustic feature, to obtain speaker characterization vectors at a voice frame level of the target voice data; afterward, integrates and fires the speaker characterization vectors at the voice frame level of the target voice data based on a CIF, to obtain a sequence of speaker characterizations bounded by speaker change points in the target voice data; and then can determine a timestamp corresponding to the speaker change points, according to the sequence of the speaker characterizations. As can be seen, since the embodiments of the present application simulate the way that a human brain processes information, fully integrating and firing speaker characterization vectors that is accumulated frame by frame in the target voice data by CIF, so as to be able to effectively improve the accuracy of the result of the speaker change point detection in the target voice data with a type of interaction.

A Second Embodiment

This embodiment will firstly describe the specific implementation mentioned in the first embodiment of the detecting the acoustic feature of the target voice data by utilizing the pre-constructed speaker change point detection model to obtain the timestamp corresponding to the speaker change points in the target voice data. The implementing process comprises Steps A-C as follows.

Step A: encoding the acoustic feature of the target voice data by utilizing the BiLSTM module in the pre-constructed speaker change point detection model, to obtain the speaker characterization vectors at the voice frame level of the target voice data.

In this embodiment, after extracting the acoustic feature of the target voice data, the BiLSTM module in the pre-constructed speaker change point detection model can be firstly utilized to encode the acoustic feature of the target voice data, and the characterization vector output by the final hidden layer of the Bi-LSTM is used as the speaker characterization vectors corresponding to the target voice data, to characterize the contextual voice information contained in the target voice data. Thus, the speaker characterization vectors H at the voice frame level characterizing the contextual voice information of the target voice data is obtained, and further is input into the CIF module in the speaker change point model.

Figure 3:
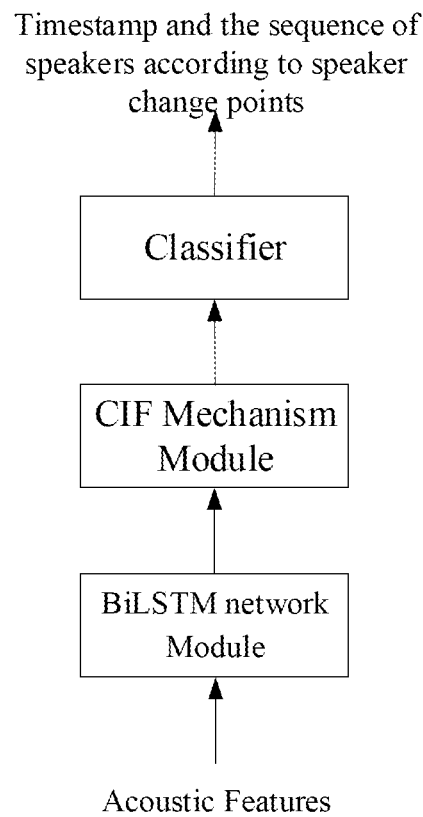
FIG. 3 is a schematic diagram of the structure of a speaker change point detection model provided by embodiments of the present application.

Herein, the compositional structure of the pre-constructed speaker change point detection model is shown in FIG. 3, which comprises a BiLSTM module, a CIF module, a classifier, and a fully connected layer and an output layer not shown in FIG. 3.

Step B: integrating and firing the speaker characterization vectors at the voice frame level of the target voice data by utilizing the CIF module in the pre-constructed speaker change point detection model, to obtain the sequence of the speaker characterizations bounded by speaker change points in the target voice data.

In this embodiment, after obtaining the speaker characterization vectors H at the voice frame level of the target voice data output by the BiLSTM module in the speaker change point detection model through the Step A, and inputting it to the CIF module in the speaker change point detection model, the speaker representation vectors at the voice frame level of the target voice data can be integrated and fired by utilizing the CIF module, to obtain the sequence of the speaker characterizations E bounded by the speaker change points in the target voice data. The sequence is input into the classifier in the speaker change point detection model (i.e., the classifier module as shown in FIG. 3). Herein, the specific process of integrating and firing process can refer to the detail description in Step 103 above, and will not be described repeatedly here.

Step C: inputting the sequence of the speaker characterizations bounded by the speaker change points in the target voice data into the classifier in the pre-constructed speaker change point detection model for decoding, in order to predict the timestamp and the corresponding speaker corresponding to each of the speaker change points according to the result of the decoding.

In this embodiment, after obtaining the sequence of the speaker characterizations E bounded through the speaker change points in the target voice data by the Step B, and inputting the sequence into the classifier in the speaker change point detection model (i.e., the classifier module as shown in FIG. 3), the sequence of the speaker characterizations E bounded by the speaker change points in the target voice data is decoded by utilizing the classifier to obtain the decoded result, and the timestamp and the corresponding speaker corresponding to each of the speaker change points are predicted according to the result of the decoding (i.e. sequence of speakers as shown in FIG. 3).

Next, this embodiment will describe the process of constructing the speaker change point detection model mentioned in the above embodiments.

Figure 4:
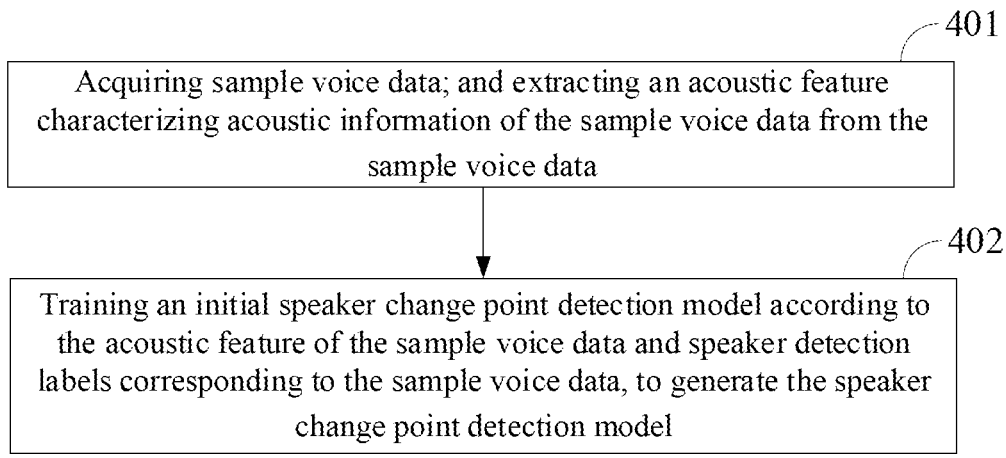
FIG. 4 is a flow schematic diagram for constructing a speaker change point detection model provided by embodiments of the present application.
Figure 5:
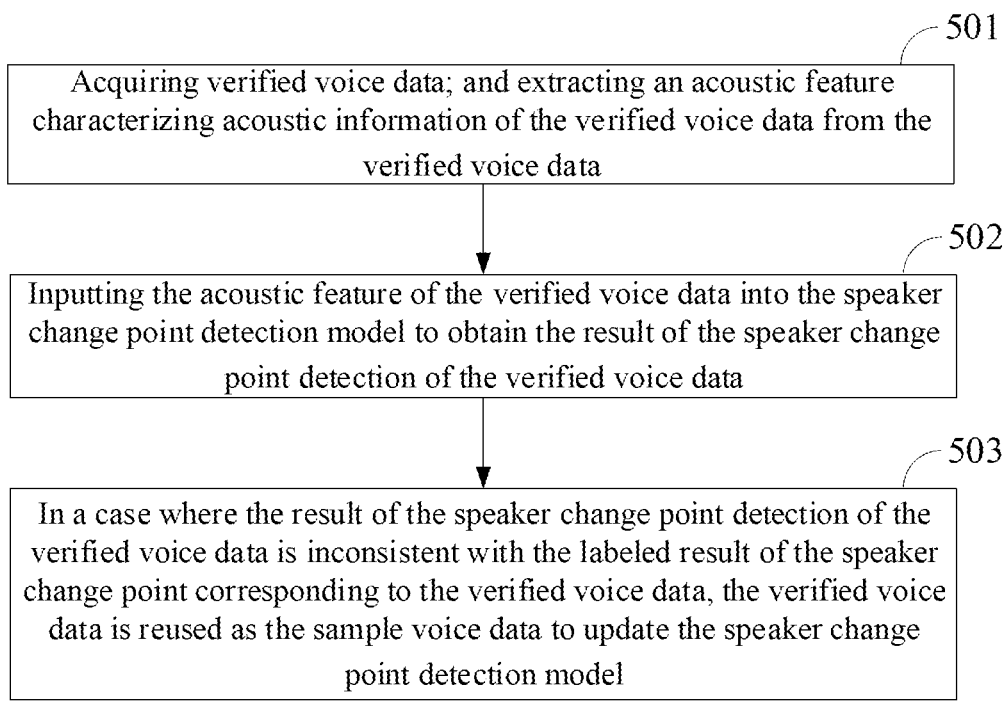
FIG. 5 is a flow schematic diagram for verifying a speaker change point detection model provided by embodiments of the present application.

As seen in FIG. 4, which illustrates a flow schematic diagram for constructing a speaker change point detection model provided by the present embodiments, which includes the Step 401-Step 402 as below.

Step 401: acquiring sample voice data; and extracting an acoustic feature characterizing acoustic information of the sample voice data from the sample voice data.

In this embodiment, in order to construct the speaker change point detection model, a large amount of preparatory work needs to be performed in advance. Firstly, a large amount of interaction voice data with multiple speakers needs to be collected. For example, the voice may be picked up by a microphone array, and the pickup device can be a tablet computer or a smart hardware device, such as a smart stereo, a TV, and an air conditioner, etc. It is usually necessary to collect at least thousands of hours of the interaction voice data which may cover a variety of application scenarios (e.g., telephone communication, classroom communication, etc.), and to perform a noise reduction on these data. Then, each piece of the collected interaction voice data with multiple speakers may serves as the sample voice data respectively, and at the same time, a timestamp corresponding to the speaker change points corresponding to these sample voice data are manually labeled in advance, which are used to train the speaker change point detection model.

Moreover, in this embodiment, after acquiring the sample voice data, the sample voice data cannot be directly used for training to generate the speaker change point detection model, but a method similar to the method for extracting an acoustic feature of the target voice data mentioned in Step 101 of the first embodiment in which the target voice data is replaced with the sample voice data is need to be used for the sample voice data, i.e., the acoustic feature of each piece of the sample voice data can be extracted. The related parts can refer to the introduction of the first embodiment, and will not be repeated here.

Step 402: training an initial speaker change point detection model according to the acoustic feature of the sample voice data and the speaker detection labels corresponding to the sample voice data, to generate the speaker change point detection model.

In this embodiment, after acquiring the sample voice data and extracting the acoustic feature therefrom through Step 401, when performing the current iteration of training, the target voice data in the first embodiment can be replaced with the sample voice data obtained in the current iteration, and the result of the speaker change point detection corresponding to the sample voice data can be output through the current initial speaker change point detection model by following the process in the Steps A-C above.

Specifically, following the Steps A-C, after extracting the acoustic feature of the sample voice data, the result of the speaker change point detection corresponding to the sample voice data can be determined through the initial speaker change point detection model. Then, the result of the detection can be compared with the timestamp corresponding to manually labeled speaker change points corresponding to the sample voice data, and the model parameters can be updated according to the difference therebetween until predetermined conditions are met. For example, if the predetermined number of training iterations is reached, the updating of the model parameters is stopped and the training for the speaker change point detection model is finished, thereby generating one trained speaker change point detection model.

It is noted that in order to improve the detection accuracy rate of the model, in the training process, one possible implementation is that the speaker change point detection model can be constructed by utilizing a given target function, the network parameters of the model can be updated, to improve the detection accuracy rate of the model. Herein, the target function for reducing the loss of multiple label classifications (i.e., if each speaker corresponds to one label classification, multiple speakers correspond to multiple label classifications) of multiple speakers, for reducing the quantity loss of the fired quantity of the CIF module, and for enhancing the deep clustering loss of the speaker characterization vectors at the voice frame level. Thus, after setting the target function, the model can be trained by multiple iterations, and after each training iteration, the network parameters of the model are updated according to the value of the target function until the value of the target function is minimized and essentially unchanged, which indicates the training of the model has been finished. At that moment, the updating of the network parameters of the model can be stopped.

Specifically, in order to train the speaker change point detection model with a more accurate detection effect, in the training process, for the training of the model, the present embodiment uses the target function as below:

$$L = L_{bce} + L_{count} + L_{dpcl} \quad (4)$$

where, L represents the target function used by the embodiment in the training process of the model; $L_{bce}$ represents the loss of the multiple label classifications (i.e., each one speaker corresponds to one label classification) of multiple speakers in the training process of the model; $L_{count}$ represents the quantity loss of the fired quantity of CIF module in the training process of the model; $L_{dpcl}$ represents the deep clustering loss of the speaker characterization vectors at the voice frame level in the training process of the model.

When training the speaker change point detection model using the target function in Eq. (4) above, the model parameters is updated continuously, according to changes in the value of L until the value of L meets the requirements, e.g., if the magnitude of the changes is very small, the updating of the model parameters is stopped and the training of the speaker change point detection model is finished.

The specific equation for calculating the loss $L_{bce}$ of the multiple label classifications in equation (4) above is as below:

$$L_{bce} = -\frac{1}{C}\sum_i \omega_i[y_i \log p_i + (1-y_i)\log(1-p_i)] \quad (5)$$

where, C represents the number of speakers contained in the training process of the model (i.e., the classification number of the speakers); y represents two values of 0 or 1 corresponding to the label, and 0 and 1 indicate the corresponding speaker is and is not included, respectively; p represents the output possibility of the model, and $p_i$ represents the possibility of the corresponding sample voice data belonging to the i-th speaker; and $\omega_i$ represents the share of the i-th speaker in the overall loss $L_{bce}$ of the multiple label classifications, whose specific value may be set according to the actual situation and the empirical value, and is not set by the embodiments of the present application, for example, it may be set to 1 by default and so on.

The specific equation for calculating the quantity loss $L_{count}$ of the fired quantity of the CIF module in equation (4) above is as below:

$$L_{count} = |N - \text{sum\_a}| \quad (6)$$

Where, N represents the quantity of the speaker changes in the sample voice data in the training process of the model; sum_a represents the accumulating sum of the amount of the difference throughout the process of integrating and firing the speaker characterization vectors at the voice frame level of the sample voice data.

The specific equation for calculating the deep clustering loss $L_{dpcl}$ of the speaker characterization vectors at the voice frame level in equation (4) above is as below:

$$L_{dpcl} = \|vv^T - ll^T\|_F^2 \quad (7)$$

$$v_t = \text{Normalize}(\text{Tanh}(\text{Linear}(h_t))) \quad (8)$$

wherein, $h_t$ represents the speaker characterization vectors fired at the voice frame level of the sample voice data in the training process of the model; Linear( ) represents a process through a linear radial layer; Tanh( ) represents a process through hyperbolic tangent; Normalize( ) represents a normalization operation; l represents a label of the speaker, which may take the value 0 or 1, and represents the corresponding speaker is contained or is not contained, respectively.

With the above embodiments, the speaker change point detection model can be generated through the training according to the sample voice data. Further, the generated speaker change point detection model can be verified using the verification voice data. The specific validation process may include Step 501-Step 503 as described below.

Step 501: acquiring verified voice data; and extracting an acoustic feature characterizing acoustic information of the verified voice data from the verified voice data.

In this embodiment, for implementing the verification for the speaker change point detection model, the verified voice data is needed to be acquired firstly, wherein the verified voice data refers to audio information that can be used for verifying the speaker change point detection model. After acquiring these verified voice data, they cannot be used for verifying the speaker change point detection model, but it is required to firstly extract an acoustic feature characterizing acoustic information of the verified voice data (such as MFCC). Then, the obtained speaker change point detection model is verified according to the acoustic feature of the verified voice data.

Step 502: inputting the acoustic feature of the verified voice data into the speaker change point detection model to obtain the result of the speaker change point detection of the verified voice data.

In this embodiment, after acquiring the verified voice data and extracting the acoustic feature of the verified voice data through Step 501, the acoustic feature of the verified voice data can be input into the speaker change point detection model to obtain the result of the speaker change point detection of the verified voice data, which is used to perform the following Step 503.

Step 503: in a case where the result of the speaker change point detection of the verified voice data is inconsistent with the labeled result of the speaker change point corresponding to the verified voice data, the verified voice data is reused as the sample voice data to update the speaker change point detection model.

In this embodiment, after obtaining the result of the speaker change point detection of the verified voice data through the Step 502, if the result of the speaker change point detection of the verified voice data is inconsistent with the labeled result of the manually labeled change point (the corresponding timestamp) corresponding to the verified voice data, the verified voice data can be reused as the sample voice data to update the parameters of the speaker change point detection model.

With the above embodiments, the speaker change point detection model can be verified effectively by utilizing the verified voice data. When the result of the speaker change point detection of the verified voice data is inconsistent with the labeled result of manually labeled change point corresponding to the verified voice data, the speaker change point detection model can be adjusted and updated in time, thereby facilitating improving the precision and accuracy of the detection model.

In summary, the speaker change point detection model trained by utilizing this embodiment, can simulate the way that a human brain processes information, thereby fully integrating and firing the speaker characterization vectors that is accumulated frame by frame in the interaction voice data, so as to be able to effectively improve the accuracy of the result of the speaker change point detection in the interaction voice data.

A Third Embodiment

This embodiment describes an apparatus for the speaker change point detection, and related contents can refer to the embodiments of the method described above.

Figure 6:
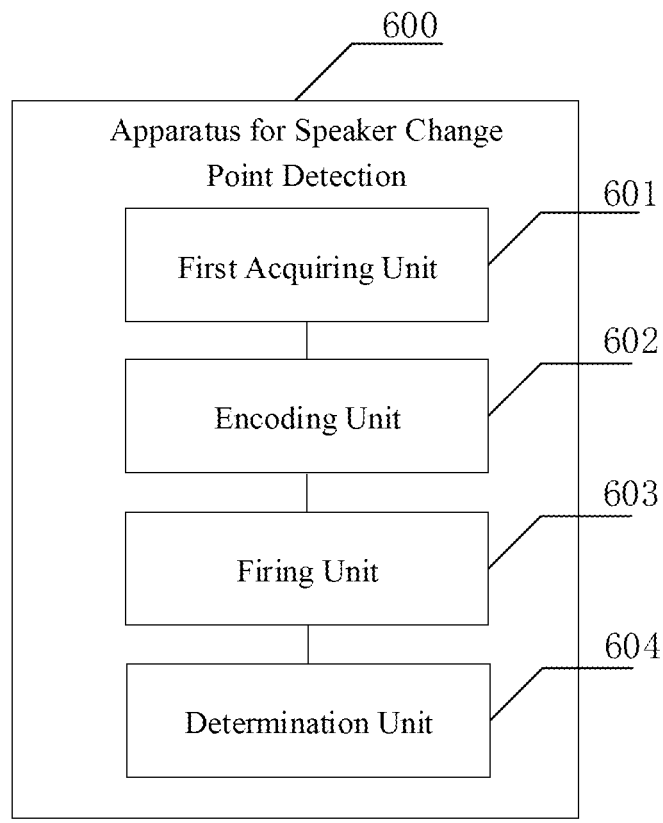
FIG. 6 is a schematic diagram of the composition of an apparatus for a speaker change point detection provided by embodiments of the present application.

Referring to FIG. 6, a schematic diagram of the composition of an apparatus for the speaker change point detection provided in this embodiment, the apparatus 600 comprises:

a first acquiring unit 601, configured to acquire target voice data to be detected; and extract an acoustic feature characterizing acoustic information of the target voice data from the target voice data;

an encoding unit 602, configured to encode the acoustic feature, to obtain speaker characterization vectors at a voice frame level of the target voice data;

a firing unit 603, configured to integrate and fire the speaker characterization vectors at the voice frame level of the target voice data based on a continuous integrate-and-fire (CIF) mechanism, to obtain a sequence of speaker characterizations bounded by speaker change points in the target voice data;

a determination unit 604, configured to determine a timestamp corresponding to the speaker change points, according to the sequence of the speaker characterizations bounded by the speaker change points in the target voice data.

In one implementation of this embodiment, the encoding unit 602 is specifically configured to:

input the acoustic feature into a bi-directional long short-term memory (BiLSTM) network for encoding, to obtain the speaker characterization vectors at the voice frame level characterizing the contextual voice information of the target voice data.

In one implementation of this embodiment, the firing unit 603 comprises:

a first calculation subunit, configured to calculate the amount of the difference between the speaker characterization vectors at the voice frame level of the target voice data at the current moment and the integrated sequence of the speaker characterizations obtained at the previous moment based on a continuous integrate-and-fire CIF mechanism, and sum up the amount of the difference obtained at the current moment and the amount of the difference obtained at the previous moment, to obtain a sum of the amount of the difference at the current moment;

a second calculation subunit, configured to obtain the sequence of the speaker characterizations corresponding to the target voice data at the current moment by a calculation of utilizing the speaker characterization vectors at the voice frame level of the target voice data at the current moment and the integrated sequence of the speaker characterizations obtained at the previous moment based on the continuous integrate-and-fire CIF mechanism, according to a principle of less integration if a large difference and more integration if a small difference;

a first firing subunit, configured to determine whether the sum of the amount of the difference at the current moment exceeds a predetermined threshold, and if so, to fire the sequence of the speaker characterizations corresponding to the target voice data at the current moment as the sequence of the speaker characterizations bounded by speaker change points.

In one implementation of this embodiment, the firing unit 603 further comprises:

a second firing subunit, configured to determine whether the sum of the amount of the difference at the current moment exceeds the predetermined threshold, and if not, to recall the first calculation subunit and the second calculation subunit to perform the calculation of the amount of the difference between the speaker characterization vectors at the voice frame level of the target voice data at the next moment and the integrated sequence of the speaker characterizations obtained at the current moment based on the continuous integrate-and-fire CIF mechanism and subsequent steps, until a sum of the amount of the difference that exceeds the predetermined threshold, and the sequence of the speaker characterizations bounded by speaker change at the corresponding moment are obtained.

In one implementation of this embodiment, the determination unit 604 is specifically configured to:

decode the sequence of the speaker characterizations bounded by the speaker change points in the target voice data, to predict the timestamp and the corresponding speaker corresponding to each of the speaker change points according to a result of the decoding.

In one implementation of this embodiment, the encoding unit 602 is specifically configured to:

encode the acoustic feature by utilizing the BiLSTM module in the pre-constructed speaker change point detection model, to obtain the speaker characterization vectors at the voice frame level of the target voice data.

In one implementation of this embodiment, the firing unit 603 is specifically configured to:

integrate and fire the speaker characterization vectors at the voice frame level of the target voice data by utilizing the CIF module in the pre-constructed speaker change point detection model, to obtain the sequence of the speaker characterizations bounded by the speaker change points in the target voice data.

In one implementation of this embodiment, the determination unit 604 is specifically configured to:

input the sequence of the speaker characterizations bounded by the speaker change points in the target voice data into the classifier in the pre-constructed speaker change point detection model to decode, to predict the timestamp and the corresponding speaker corresponding to each of the speaker change points according to the result of the decoding.

In one implementation of this embodiment, the apparatus further comprises:

a second acquiring unit, configured to acquire sample voice data; and extract an acoustic feature characterizing acoustic information of the sample voice data from the sample voice data;

a training unit, configured to train an initial speaker change point detection model according to the acoustic feature of the sample voice data and speaker detection labels corresponding to the sample voice data, to generate the speaker change point detection model.

In one implementation of this embodiment, the apparatus further comprises:

a third acquiring unit, configured to acquire verified voice data; and extract an acoustic feature characterizing acoustic information of the verified voice data from the verified voice data;

an obtaining unit, configured to input the acoustic feature of the verified voice data into the speaker change point detection model to obtain a result of the speaker change point detection of the verified voice data; and an update unit, configured to reuse the verified voice data as the sample voice data to update the speaker change point detection model, in a case where the result of the speaker change point detection of the verified voice data is inconsistent with the labeled result of the speaker change point corresponding to the verified voice data.

In one implementation of this embodiment, the speaker change point detection model is obtained by the training using a target function, wherein the target function is for reducing the loss of multiple label classifications of multiple speakers, for reducing the quantity loss of the fired quantity of the CIF module, and for enhancing the deep clustering loss of the speaker characterization vectors at the voice frame level.

Further, the embodiments of the present application also provide an electronic device, the electronic device comprising: a processor and a memory;

the memory, is configured to store instructions or computer programs;

the processor, is configured to execute the instructions or the computer programs in the memory, to cause the electronic device to perform any of the implementations of the method for the speaker change point detection described above.

Further, the embodiments of the present application also provide a computer-readable storage medium, the computer-readable storage medium having instructions stored therein, upon the computer programs are executed by a terminal device, to cause the terminal device to perform any of the implementations of the method for the speaker change point detection described above.

Figure 7:
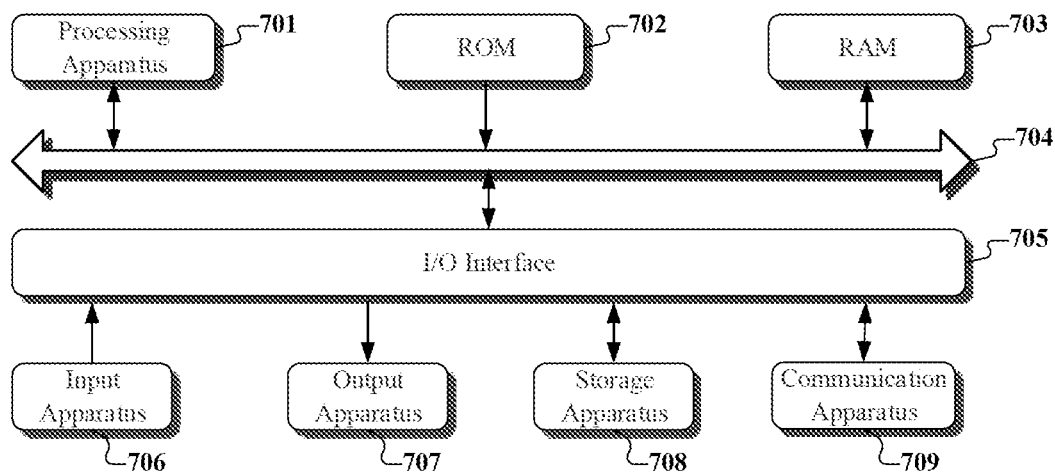
FIG. 7 is a schematic diagram of a basic structure of an electronic device provided by embodiments of the present application.

Referring to FIG. 7 below, which illustrates a schematic diagram of a structure of an electronic device suitable to implement embodiments of the present disclosure. The electronic device in embodiments of the present disclosure may include, but are not limited to, mobile terminals such as mobile telephones, laptop computers, digital broadcast receivers, PDAs (personal digital assistants), PADs (tablet computers), PMPs (portable multimedia players), in-vehicle terminals (e.g., in-vehicle navigation terminals), and the like, as well as stationary terminals such as digital TVs, desktop computers, and the like, and may also include server devices. The electronic device illustrated in FIG. 7 is merely an example and should not impose any limitations on the functions and scope of use of the embodiments of the present disclosure.

As shown in FIG. 7, the electronic device may include a processing apparatus (e.g., a central processor, a graphics processor, etc.) 701 that may perform various appropriate actions and processes based on a program stored in read-only memory (ROM) 702 or loaded from a storage apparatus 708 into random access memory (RAM) 703. Various programs and data necessary for the operation of the electronic device are also stored in the RAM 703. The processing apparatus 701, the ROM 702, and the RAM 703 are connected to each other via a bus 704. The input/output (I/O) interface 705 is also connected to the bus 704.

Typically, the following apparatus may be connected to the I/O interface 705: an input apparatus 706 including, for example, a touch screen, a touch pad, a keyboard, a mouse, a camera, a microphone, an accelerometer, a gyroscope, and the like; an output apparatus 707 including, for example, a liquid crystal display (LCD), a loudspeaker, a vibrator, and the like; a storage apparatus 708 including, for example, a magnetic tape, a hard disk, and the like; and a communication apparatus 709. The communication apparatus 709 may allow the electronic device to have wireless or wired communication with other devices to exchange data. While FIG. 7 illustrates an electronic device with various apparatuses, it should be understood that it is not required to implement or have all of the illustrated apparatuses. More or fewer apparatuses may alternatively be implemented or possessed.

In particular, according to the embodiments of the present disclosure, the process described above with reference to the flowchart may be implemented as a computer software program. For example, the embodiments of the present disclosure comprise a computer program product comprising a computer program carried on a non-transitory computer-readable medium, the computer program comprising a program code for performing the method shown in the flowchart. In such embodiments, the computer program may be downloaded and installed from a network via a communication apparatus 709, or installed from a storage apparatus 708, or installed from a ROM 702. When the computer program is executed by the processing apparatus 701, the described-above functionalities defined in the method of the embodiments of the present disclosure are performed.

According to one or more embodiments of the present disclosure, [Example I] provides a method for speaker change point detection, the method comprising:

acquiring target voice data to be detected; and extracting an acoustic feature characterizing acoustic information of the target voice data from the target voice data;

encoding the acoustic feature to obtain speaker characterization vectors at a voice frame level of the target voice data;

integrating and firing the speaker characterization vectors at the voice frame level of the target voice data based on a continuous integrate-and-fire CIF mechanism, to obtain a sequence of speaker characterizations bounded by speaker change points in the target voice data; and determining a timestamp corresponding to the speaker change points, according to the sequence of the speaker characterizations bounded by the speaker change points in the target voice data.

According to one or more embodiments of the present disclosure, [Example II] provides the method for speaker change point detection, the encoding the acoustic feature to obtain the speaker characterization vectors at the voice frame level of the target voice data, comprising:

inputting the acoustic feature into a bi-directional long short-term memory BiLSTM network for encoding, to obtain the speaker characterization vectors at the voice frame level characterizing contextual voice information of the target voice data.

According to one or more embodiments of the present disclosure, [Example III] provides the method for speaker change point detection, the integrating and firing the speaker characterization vectors at the voice frame level of the target voice data based on the continuous integrate-and-fire CIF mechanism, to obtain the sequence of the speaker characterizations bounded by the speaker change points in the target voice data, comprising:

calculating the amount of the difference between the speaker characterization vectors at the voice frame level of the target voice data at a current moment and the integrated sequence of the speaker characterizations obtained at a previous moment based on the continuous integrate-and-fire CIF mechanism, and summing up the amount of the difference obtained at the current moment and an amount of a difference obtained at the previous moment, to obtain a sum of the amount of the difference at the current moment;

obtaining the sequence of the speaker characterizations corresponding to the target voice data at the current moment by a calculation of utilizing the speaker characterization vectors at the voice frame level of the target voice data at the current moment and the integrated sequence of the speaker characterizations obtained at the previous moment based on the continuous integrate-and-fire CIF mechanism, according to a principle of less integration if a large difference and more integration if a small difference; and determining whether the sum of the amount of the difference at the current moment exceeds a predetermined threshold; and if so, firing the sequence of the speaker characterizations corresponding to the target voice data at the current moment as the sequence of the speaker characterizations bounded by the speaker change points.

According to one or more embodiments of the present disclosure, [Example IV] provides the method for speaker change point detection, the method further comprising:
determining whether the sum of the amount of the difference at the current moment exceeds a predetermined threshold, and if not, re-performing the calculation of the amount of the difference between the speaker characterization vectors at the voice frame level of the target voice data at the next moment and the integrated sequence of the speaker characterizations obtained at the current moment based on the continuous integrate-and-fire CIF mechanism and subsequent steps, until a sum of the amount of the difference that exceeds the predetermined threshold, and the sequence of speaker characterizations bounded by the speaker change pointes at a corresponding moment.

According to one or more embodiments of the present disclosure, [Example V] provides the method for speaker change point detection, the determining the timestamp corresponding to the speaker change points, according to the sequence of the speaker characterizations bounded by the speaker change points in the target voice data, comprising:
decoding the sequence of the speaker characterizations bounded by the speaker change points in the target voice data, to predict the timestamp and the corresponding speaker corresponding to each of the speaker change points according to a result of the decoding.

According to one or more embodiments of the present disclosure, [Example VI] provides the method for speaker change point detection, the encoding the acoustic feature to obtain the speaker characterization vectors at the voice frame level of the target voice data, comprising:
encoding the acoustic feature by utilizing a BiLSTM module in a pre-constructed speaker change point detection model, to obtain the speaker characterization vectors at the voice frame level of the target voice data.

According to one or more embodiments of the present disclosure, [Example VII] provides the method for speaker change point detection, the integrating and firing the speaker characterization vectors at the voice frame level of the target voice data based on the continuous integrate-and-fire CIF mechanism, to obtain the sequence of the speaker characterizations bounded by the speaker change points in the target voice data, comprising:
integrating and firing the speaker characterization vectors at the voice frame level of the target voice data by utilizing a CIF module in the pre-constructed speaker change point detection model, to obtain the sequence of the speaker characterizations bounded by the speaker change points in the target voice data.

According to one or more embodiments of the present disclosure, [Example VIII] provides the method for speaker change point detection, the determining the timestamp corresponding to the speaker change points, according to the sequence of the speaker characterizations bounded by the speaker change points in the target voice data, comprising:
inputting the sequence of the speaker characterizations bounded by the speaker change points in the target voice data into a classifier in the pre-constructed speaker change point detection model to decode, to predict the timestamp and the corresponding speaker corresponding to each of the speaker change points according to the result of the decoding.

According to one or more embodiments of the present disclosure, [Example VIIII] provides the method for speaker change point detection, constructing the speaker change point detection model by:
acquiring sample voice data; and extracting an acoustic feature characterizing acoustic information of the sample voice data from the sample voice data;
training an initial speaker change point detection model according to the acoustic feature of the sample voice data and speaker detection labels corresponding to the sample voice data, to generate the speaker change point detection model.

According to one or more embodiments of the present disclosure, [Example IX] provides the method for speaker change point detection, the method comprising:
acquiring verified voice data; and extracting an acoustic feature characterizing acoustic information of the verified voice data from the verified voice data;
inputting the acoustic feature of the verified voice data into the speaker change point detection model to obtain a result of the speaker change point detection of the verified voice data; and
reusing the verified voice data as the sample voice data to update the speaker change point detection model, in a case where the result of the speaker change point detection of the verified voice data is inconsistent with a labeled result of the speaker change point corresponding to the verified voice data.

According to one or more embodiments of the present disclosure, [Example XI] provides the method for speaker change point detection, wherein the speaker change point detection model is obtained by the training using a target function, and wherein the target function is for reducing a loss of multiple label classifications of multiple speakers, for reducing a quantity loss of a fired quantity of the CIF module, and for enhancing a deep clustering loss of the speaker characterization vectors at the voice frame level.

According to one or more embodiments of the present disclosure, [Example XII] provides an apparatus for speaker change point detection, the apparatus comprising:
a first acquiring unit, configured to acquire target voice data to be detected; and extract an acoustic feature characterizing acoustic information of the target voice data from the target voice data;
an encoding unit, configured to encode the acoustic feature, to obtain speaker characterization vectors at a voice frame level of the target voice data;
a firing unit, configured to integrate and fire the speaker characterization vectors at the voice frame level of the target voice data based on a continuous integrate-and-fire (CIF) mechanism, to obtain a sequence of speaker characterizations bounded by speaker change points in the target voice data; and
a determination unit, configured to determine a timestamp corresponding to the speaker change points, according to the sequence of the speaker characterizations bounded by the speaker change points in the target voice data.

According to one or more embodiments of the present disclosure, [Example XIII] provides the apparatus for speaker change point detection, the encoding unit is specifically configured to:
input the acoustic feature into a bi-directional long short-term memory BiLSTM network for encoding, to obtain the speaker characterization vectors at the voice frame level characterizing contextual voice information of the target voice data.

According to one or more embodiments of the present disclosure, [Example XIV] provides the apparatus for speaker change point detection, the firing unit comprising:

a first calculation subunit, configured to calculate an amount of a difference between the speaker characterization vectors at the voice frame level of the target voice data at a current moment and the integrated sequence of the speaker characterizations obtained at a previous moment based on a continuous integrate-and-fire CIF mechanism, and to sum up the amount of the difference obtained at the current moment and the amount of the difference obtained at the previous moment, to obtain a sum of the amount of the difference at the current moment;

a second calculation subunit, configured to obtain a sequence of the speaker characterizations corresponding to the target voice data at the current moment by a calculation of utilizing the speaker characterization vectors at the voice frame level of the target voice data at the current moment and the integrated sequence of the speaker characterizations obtained at the previous moment based on the continuous integrate-and-fire CIF mechanism, according to a principle of less integration if a large difference and more integration if a small difference;

a first firing subunit, configured to determine whether the sum of the amount of the difference at the current moment exceeds a predetermined threshold, and if so, to fire the sequence of the speaker characterizations corresponding to the target voice data at the current moment as the sequence of the speaker characterizations bounded by the speaker change points.

According to one or more embodiments of the present disclosure, [Example XV] provides the apparatus for speaker change point detection, the firing unit further comprising:

a second firing subunit, configured to determine whether the sum of the amount of the difference at the current moment exceeds the predetermined threshold, and if not, to recall the first calculation subunit and the second calculation subunit to perform the calculation of the amount of the difference between the speaker characterization vectors at the voice frame level of the target voice data at the next moment and the integrated sequence of the speaker characterizations obtained at the current moment based on the continuous integrate-and-fire CIF mechanism and subsequent steps, until a sum of the amount of the difference that exceeds the predetermined threshold, and the sequence of the speaker characterizations bounded by the speaker change pointes at a corresponding moment are obtained.

According to one or more embodiments of the present disclosure, [Example XVI] provides the apparatus for speaker change point detection, the determination unit is specifically configured to:

decode the sequence of the speaker characterizations bounded by the speaker change points in the target voice data, to predict the timestamp and a corresponding speaker corresponding to each of the speaker change points according to a result of the decoding.

According to one or more embodiments of the present disclosure, [Example XVII] provides the apparatus for speaker change point detection, the encoding unit is specifically configured to:

encode the acoustic feature by utilizing a BiLSTM module in a pre-constructed speaker change point detection model, to obtain the speaker characterization vectors at the voice frame level of the target voice data.

According to one or more embodiments of the present disclosure, [Example XVIII] provides the apparatus for speaker change point detection, the firing unit is specifically configured to:

integrate and fire the speaker characterization vectors at the voice frame level of the target voice data by utilizing a CIF module in the pre-constructed speaker change point detection model, to obtain the sequence of the speaker characterizations bounded by the speaker change points in the target voice data.

According to one or more embodiments of the present disclosure, [Example XIX] provides the apparatus for speaker change point detection, the determination unit is specifically configured to:

input the sequence of the speaker characterizations bounded by the speaker change points in the target voice data into a classifier in the pre-constructed speaker change point detection model to decode, to predict the timestamp and the corresponding speaker corresponding to each of the speaker change points according to a result of the decoding.

According to one or more embodiments of the present disclosure, [Example XX] provides the apparatus for speaker change point detection, the apparatus further comprising:

a second acquiring unit, configured to acquire sample voice data; and extract an acoustic feature characterizing acoustic information of the sample voice data from the sample voice data; and a training unit, configured to train an initial speaker change point detection model according to the acoustic feature of the sample voice data and speaker detection labels corresponding to the sample voice data, to generate the speaker change point detection model.

According to one or more embodiments of the present disclosure, [Example XXI] provides the apparatus for speaker change point detection, the apparatus further comprising:

a third acquiring unit, configured to acquire verified voice data; and extract an acoustic feature characterizing acoustic information of the verified voice data from the verified voice data;

an obtaining unit, configured to input the acoustic feature of the verified voice data into the speaker change point detection model to obtain a result of the speaker change point detection of the verified voice data; and an update unit, configured to reuse the verified voice data as the sample voice data to update the speaker change point detection model, in a case where the result of the speaker change point detection of the verified voice data is inconsistent with a labeled result of the speaker change point corresponding to the verified voice data.

According to one or more embodiments of the present disclosure, [Example XXII] provides the apparatus for speaker change point detection, wherein the speaker change point detection model is obtained by the training using a target function, and wherein the target function is for reducing a loss of multiple label classifications of multiple speakers, for reducing a quantity loss of a fired quantity of the CIF module, and for enhancing a deep clustering loss of the speaker characterization vectors at the voice frame level.

As can be known from the above description of the implementations, it is clear to those of ordinary skilled in the art that all or some of the steps in the method of the above embodiments can be implemented with the aid of software plus the necessary general hardware platform. Based on this understanding, the technical solution of the present application may essentially, or the part contributing to the prior art, be embodied in the form of a software product, which may be stored in a storage medium, such as a ROM/RAM, a disk, a CD-ROM, and the like, and include a number of commands to enable a computer device (which may be a personal computer, a server, or a network communication device, such as a media gateway, and the like) to execute the method described in various embodiments of the present application, or certain portions of the embodiments.

It should be noted that the embodiments in this specification are described in a recursive manner, with each embodiment focusing on differences from the other embodiments, and the same and similar portions of each embodiment being cross-referenced to each other. For the apparatus disclosed in the embodiments, since it corresponds to the method disclosed in the embodiments, the description is relatively simple, and it is sufficient to refer to the method portion of the description where relevant.

It is also noted that in this document, relational terms such as first and second are used only to distinguish one entity or operation from another, and do not necessarily require or imply the existence of any such actual relationship or order between the entities or operations. Furthermore, the terms "including", "comprising", or any other variant thereof, are intended to cover non-exclusive inclusion, such that a process, method, article, or apparatus comprising a set of elements includes not only those elements, but also other elements not expressly listed, or other elements not expressly listed for the purpose of such a process, method, article or apparatus, or other elements not expressly listed elements, or also includes elements that are inherent to such process, method, article or apparatus. Without further limitation, the fact that an element is defined by the phrase "includes one . . . " does not preclude the existence of another identical element in the process, method, article, or apparatus that includes said element.

The foregoing description of the disclosed embodiments enables those of ordinary skilled in the art to implement or use the present application. Various modifications to these embodiments will be apparent to those skilled in the art, and the general principles defined herein may be implemented in other embodiments without departing from the spirit or scope of this application. Accordingly, the present application will not be limited to these embodiments shown herein, but will be subject to the broadest scope consistent with the principles and novel features disclosed herein.

What is claimed is:

1. A method for speaker change point detection, the method comprising:
   acquiring target voice data to be detected; and extracting an acoustic feature characterizing acoustic information of the target voice data from the target voice data;
   encoding the acoustic feature to obtain speaker characterization vectors at a voice frame level of the target voice data;
   integrating and firing the speaker characterization vectors at the voice frame level of the target voice data based on a continuous integrate-and-fire CIF mechanism, to obtain a sequence of speaker characterizations bounded by speaker change points in the target voice data; and
   determining a timestamp corresponding to the speaker change points, according to the sequence of the speaker characterizations bounded by the speaker change points in the target voice data.

2. The method of claim 1, wherein the encoding the acoustic feature to obtain the speaker characterization vectors at the voice frame level of the target voice data, comprises:
   inputting the acoustic feature into a bi-directional long short-term memory BiLSTM network to encode, to obtain the speaker characterization vectors at the voice frame level characterizing contextual voice information of the target voice data.

3. The method of claim 1, wherein the integrating and firing the speaker characterization vectors at the voice frame level of the target voice data based on the continuous integrate-and-fire CIF mechanism, to obtain the sequence of the speaker characterizations bounded by the speaker change points in the target voice data, comprises:
   calculating an amount of the difference between the speaker characterization vectors at the voice frame level of the target voice data at a current moment and the integrated sequence of the speaker characterizations obtained at a previous moment based on the CIF, and summing up the amount of the difference obtained at the current moment and the amount of the difference obtained at the previous moment, to obtain a sum of the amount of the difference at the current moment;
   obtaining the sequence of the speaker characterizations corresponding to the target voice data at the current moment by a calculation of utilizing the speaker characterization vectors at the voice frame level of the target voice data at the current moment and the integrated sequence of the speaker characterizations obtained at the previous moment based on the CIF, according to a principle of less integration if a large difference and more integration if a small difference; and
   determining whether the sum of the amount of the difference at the current moment exceeds a predetermined threshold; and if so, firing the sequence of the speaker characterizations corresponding to the target voice data at the current moment as the sequence of the speaker characterizations bounded by the speaker change points.

4. The method of claim 3, the method further comprising:
   in a case of determining that the sum of the amount of the difference at the current moment does not exceed the predetermined threshold, re-performing the calculation of the amount of the difference between the speaker characterization vectors at the voice frame level of the target voice data at a next moment and the integrated sequence of the speaker characterizations obtained at the current moment based on the continuous integrate-and-fire CIF mechanism and subsequent steps, until a sum of the amount of the difference that exceeds the predetermined threshold, and the sequence of the speaker characterizations bounded by the speaker change pointes at a corresponding moment are obtained.

5. The method of claim 1, wherein the determining the timestamp corresponding to the speaker change points, according to the sequence of the speaker characterizations bounded by the speaker change points in the target voice data, comprises:

decoding the sequence of the speaker characterizations bounded by the speaker change points in the target voice data, to predict the timestamp and a corresponding speaker corresponding to each of the speaker change points according to a result of the decoding.

6. The method of claim 1, wherein the encoding the acoustic feature to obtain the speaker characterization vectors at the voice frame level of the target voice data, comprises:
encoding the acoustic feature by utilizing a BiLSTM module in a pre-constructed speaker change point detection model, to obtain the speaker characterization vectors at the voice frame level of the target voice data.

7. The method of claim 6, wherein the integrating the speaker characterization vectors at the voice frame level of the target voice data based on the continuous integrate-and-fire CIF mechanism, to obtain the sequence of the speaker characterizations bounded by the speaker change points in the target voice data, comprises:
integrating and firing the speaker characterization vectors at the voice frame level of the target voice data by utilizing a CIF module in the pre-constructed speaker change point detection model, to obtain the sequence of the speaker characterizations bounded by the speaker change points in the target voice data.

8. The method of claim 7, wherein the determining the timestamp corresponding to the speaker change points, according to the sequence of the speaker characterizations bounded by the speaker change points in the target voice data, comprises:
inputting the sequence of the speaker characterizations bounded by the speaker change points in the target voice data into a classifier in the pre-constructed speaker change point detection model to decode, to predict the timestamp and the corresponding speaker corresponding to each of the speaker change points according to the result of the decoding.

9. The method of claim 8, wherein constructing the speaker change point detection model comprises:
acquiring sample voice data; and extracting an acoustic feature characterizing acoustic information of the sample voice data from the sample voice data; and
training an initial speaker change point detection model according to the acoustic feature of the sample voice data and speaker detection labels corresponding to the sample voice data, to generate the speaker change point detection model.

10. The method of claim 9, the method further comprising:
acquiring verified voice data; and extracting an acoustic feature characterizing acoustic information of the verified voice data from the verified voice data;
inputting the acoustic feature characterizing acoustic information of the verified voice data into the speaker change point detection model to obtain the result of the speaker change point detection of the verified voice data; and
reusing the verified voice data as the sample voice data to update the speaker change point detection model, in a case where the result of the speaker change point detection of the verified voice data is inconsistent with a labeled result of the speaker change point corresponding to the verified voice data.

11. The method of claim 6, wherein the speaker change point detection model is obtained by the training using a target function, and wherein the target function is for reducing a loss of multiple label classifications of multiple speakers, for reducing a quantity loss of a fired quantity of the CIF module, and for enhancing a deep clustering loss of the speaker characterization vectors at the voice frame level.

12. An electronic device, comprising: a processor and a memory;
the memory, is configured to store instructions or computer programs; and
the processor, is configured to execute the instructions or the computer programs in the memory, to cause the electronic device to:
acquire target voice data to be detected; and extract an acoustic feature characterizing acoustic information of the target voice data from the target voice data;
encode the acoustic feature to obtain speaker characterization vectors at a voice frame level of the target voice data;
integrate and fire the speaker characterization vectors at the voice frame level of the target voice data based on a continuous integrate-and-fire CIF mechanism, to obtain a sequence of speaker characterizations bounded by speaker change points in the target voice data; and
determine a timestamp corresponding to the speaker change points, according to the sequence of the speaker characterizations bounded by the speaker change points in the target voice data.

13. The electronic device of claim 12, wherein to encode the acoustic feature to obtain the speaker characterization vectors at the voice frame level of the target voice data, the processor, is configured to execute the instructions or the computer programs in the memory, to cause the electronic device to:
input the acoustic feature into a bi-directional long short-term memory BiLSTM network to encode, to obtain the speaker characterization vectors at the voice frame level characterizing contextual voice information of the target voice data.

14. The electronic device of claim 12, wherein to integrate and fire the speaker characterization vectors at the voice frame level of the target voice data based on the continuous integrate-and-fire CIF mechanism, to obtain the sequence of the speaker characterizations bounded by the speaker change points in the target voice data, the processor, is configured to execute the instructions or the computer programs in the memory, to cause the electronic device to:
calculate an amount of the difference between the speaker characterization vectors at the voice frame level of the target voice data at a current moment and the integrated sequence of the speaker characterizations obtained at a previous moment based on the CIF, and sum up the amount of the difference obtained at the current moment and the amount of the difference obtained at the previous moment, to obtain a sum of the amount of the difference at the current moment;
obtain the sequence of the speaker characterizations corresponding to the target voice data at the current moment by a calculation of utilizing the speaker characterization vectors at the voice frame level of the target voice data at the current moment and the integrated sequence of the speaker characterizations obtained at the previous moment based on the CIF, according to a principle of less integration if a large difference and more integration if a small difference; and
determine whether the sum of the amount of the difference at the current moment exceeds a predetermined threshold; and if so, fire the sequence of the speaker characterizations corresponding to the target voice data at the current moment as the sequence of the speaker characterizations bounded by the speaker change points.

15. The electronic device of claim 14, wherein the processor, is configured to execute the instructions or the computer programs in the memory, to cause the electronic device to further:
in a case of determining that the sum of the amount of the difference at the current moment does not exceed the predetermined threshold, re-perform the calculation of the amount of the difference between the speaker characterization vectors at the voice frame level of the target voice data at a next moment and the integrated sequence of the speaker characterizations obtained at the current moment based on the continuous integrate-and-fire CIF mechanism and subsequent steps, until a sum of the amount of the difference that exceeds the predetermined threshold, and the sequence of the speaker characterizations bounded by the speaker change pointes at a corresponding moment are obtained.

16. The electronic device of claim 12, wherein to determine the timestamp corresponding to the speaker change points, according to the sequence of the speaker characterizations bounded by the speaker change points in the target voice data, the processor, is configured to execute the instructions or the computer programs in the memory, to cause the electronic device to:
decode the sequence of the speaker characterizations bounded by the speaker change points in the target voice data, to predict the timestamp and a corresponding speaker corresponding to each of the speaker change points according to a result of the decoding.

17. The electronic device of claim 12, wherein to encode the acoustic feature to obtain the speaker characterization vectors at the voice frame level of the target voice data, the processor, is configured to execute the instructions or the computer programs in the memory, to cause the electronic device to:
encode the acoustic feature by utilizing a BiLSTM module in a pre-constructed speaker change point detection model, to obtain the speaker characterization vectors at the voice frame level of the target voice data.

18. The electronic device of claim 17, wherein to integrate the speaker characterization vectors at the voice frame level of the target voice data based on the continuous integrate-and-fire CIF mechanism, to obtain the sequence of the speaker characterizations bounded by the speaker change points in the target voice data, the processor, is configured to execute the instructions or the computer programs in the memory, to cause the electronic device to:
integrate and fire the speaker characterization vectors at the voice frame level of the target voice data by utilizing a CIF module in the pre-constructed speaker change point detection model, to obtain the sequence of the speaker characterizations bounded by the speaker change points in the target voice data.

19. The electronic device of claim 18, wherein to determine the timestamp corresponding to the speaker change points, according to the sequence of the speaker characterizations bounded by the speaker change points in the target voice data, the processor, is configured to execute the instructions or the computer programs in the memory, to cause the electronic device to:
input the sequence of the speaker characterizations bounded by the speaker change points in the target voice data into a classifier in the pre-constructed speaker change point detection model to decode, to predict the timestamp and the corresponding speaker corresponding to each of the speaker change points according to the result of the decoding.

20. A non-transitory computer-readable storage medium having instructions stored therein, the instructions when executed by a terminal device, to cause the terminal device to:
acquire target voice data to be detected; and extract an acoustic feature characterizing acoustic information of the target voice data from the target voice data;
encode the acoustic feature to obtain speaker characterization vectors at a voice frame level of the target voice data;
integrate and fire the speaker characterization vectors at the voice frame level of the target voice data based on a continuous integrate-and-fire CIF mechanism, to obtain a sequence of speaker characterizations bounded by speaker change points in the target voice data; and
determine a timestamp corresponding to the speaker change points, according to the sequence of the speaker characterizations bounded by the speaker change points in the target voice data.

* * * * *